UNITED STATES PATENT OFFICE 2,090,421

PROCESS OF MAKING CONCRETE

Harry McC. Larmour and Stephen C. Pierce, Jr., Merced, Calif.

No Drawing. Application March 9, 1935, Serial No. 10,250

10 Claims. (Cl. 106—24)

In the normal practice of making concrete the cement is received from the manufacturer in a finely divided dry state and mixed with water and aggregate to make the mass for placing. Sometimes it is found expedient to add certain accelerators or admixtures to the mixture for the purpose of improving some phase of the concrete performance. It has further, for specific purposes, been found useful to pre-mix a paste of the cement with water prior to incorporation with the aggregate for special performance. Our invention goes further and intergrinds the clinker itself with water to make a cement slurry therefrom immediately prior to incorporation with the aggregate and placing in the forms.

In practice a concrete is designed for strength on the basis of the amount of water to be used with a given unit of cement. Taking this as a basis then we would decide on the strength requirement of the design required. This design would determine the proportions of cement and water to be used. Part or all of the clinker required to produce the cement and part or all of the water are introduced into some suitable grinding mill and ground at a fixed rate to cement fineness. The discharged slurry is then at once incorporated with aggregate in a suitable mixer and placed in the forms as desired for the structural plan.

We find that this practice gives concrete strength far in excess of standard practice. It is of benefit as it permits increase in the matter of strength or, if desired, can be used to lessen the cement factor with respect to the aggregate. In other words, the grinding of the clinker with water directly into a cement slurry and immediate use in concrete yields a more active cement than cement not so produced. The increase in activity is shown in its efficiency as a cementitious agent with the result of increased density and strength or increased value per unit of cement.

In the examples given below:

Sample No. 1 is a dry Portland cement prepared by grinding clinker and gypsum in a ball mill for a period of 30 minutes. Sample No. 2 is a second quarter of the same sample of clinker and gypsum used in No. 1 except that it was ground 45 minutes in the same mill with the same rate of power input. Samples No. 3 and 4 were of the same clinker and gypsum and ground as above in the same manner except that water was added in each case to the clinker and the grinding for the respective periods, 30 and 45 minutes, carried on in the presence of water.

|  | Grinding time | Compressive strength | | |
|---|---|---|---|---|
|  |  | 1 day | 3 days | 7 days |
| Dry grinds { No. 1 | 30 min | 573 | 1,719 | 2,419 |
| Dry grinds { No. 2 | 45 min | 960 | 2,419 | 3,390 |
| Wet grinds { No. 3 | 30 min | 1,019 | 2,546 | 4,329 |
| Wet grinds { No. 4 | 45 min | 1,630 | 3,883 | 5,240 |

In the cases of the dry grinds the cement so produced was mixed with three parts of sand by weight and tempered with a volume of water equivalent to volumetric water cement ratio of .85 or 60% by weight of cement. 2" x 4" cylinders were cast and tested in compression as indicated. In the cases of the wet grinds clinker and gypsum were mixed with water in the amount corresponding to the above ratio and the two ground together, then the slurry resulting was mixed with sand in the same proportion as above and cylinders made and cast. The dry cement present in the wet mix was checked by ignition to be sure of the comparison being accurate between equivalent amounts of cement, and the difference was that one was manufactured wet and the other dry. The most significant comparison to show the value of the process is that shown by samples 2 and 3. It is to be noted that No. 3 decidedly outperforms No. 2, and yet is produced at only ⅔ of the cost of No. 2.

In a commercial way the process may be practiced by introducing water and Portland cement clinker into a grinding mill in the radio predetermined as proper for design performance and grinding the same with water into cement at a rate consistent with construction flow. The discharge paste or slurry is then at once incorporated with aggregate and placed in the forms. In the event that special admixtures are desired in the concrete for specific purposes it will usually be found advantageous to include them in the intergrind of the clinker and water.

We do not limit ourselves as to the amount of water added except that it be sufficient to permit plastic flow discharge of the mixture of cement and water from the mill. As to the extreme water to be added, it will be controlled by the economies of the process. The amount should not be in excess of the total water required for the concrete design, though the amount of water added to the clinker to make for plastic flow from the mill may not be all of the water necessary to the concrete design, the remainder may be added at the mixer with the aggregate.

In the matter of Portland clinker we refer to a Portland cement clinker considered in the broad sense of the term, and which may be in form as discharged from the kiln, or may be crushed to about quarter-inch pieces. Extraneous materials such as gypsum products, puzzuolans, and other admixtures may be incorporated in the clinker by the manufacturer or added thereto for workability, density or control of wet without interfering with our process.

From the standpoint of this invention the difference between clinker and cement is one of considerable importance. This matter would not interest us if carried out with cement as it would represent practically twice the grinding cost, and, unless the cement were freshly ground and at once shipped to the job, even regrinding into a slurry would not give it the properties of our slurry made direct from the unground clinker, nor would the advantages of wet grinding which permits much finer grinding at less expenditure of time and power, be secured.

Pre-crushing of the clinker to about quarter inch is about as far as any factory aide could go without losing some of the advantages of the method of our invention, and the amount of concrete involved from the set-up would be the limiting factor in deciding the economics of the most desirable form of clinker to supply. The coarser the clinker supplied to the job, the more grinding equipment necessary. In large jobs, however, the complete reduction from kiln discharge size is always preferable due to the great economy of wet grinding over the usual dry grinding which is necessitated in the ordinary method of grinding since the cement of commerce must be stored as a dry powder after grinding.

The efficiency of our method of preparation will now be apparent to the cement expert so that little or no further discussion is required. The main reason is that wet grinding in the form of a slurry is more efficient than dry. Chemical processes always proceed more energetically where new surfaces of material are freshly exposed for reaction similar to elements in their nascent state. Wet grinding also makes for greater particle fineness with a given time of grinding and the grinding permits the exposure of new surfaces to contact the water as the process proceeds.

Our process then, briefly described, consists in a method of increasing the activity of a cement in concrete over that which it would normally attain which comprises grinding the clinker to cement fineness with water, with or without the addition of admixtures, at the job for immediate incorporation with the aggregate in the concrete and placing the same. In the matter of admixtures, we refer to any extraneous material added to the cement or concrete for the purpose of imparting some particular property to the concrete.

We believe that our method is new and novel, will yield a stronger concrete with the same amount of cement, and effect a great saving in industry, and its value is easily demonstrated.

We therefore claim:

1. The method of making concrete which comprises grinding clinker with sufficient water to discharge a flowing mixture of cement fineness, incorporating the same at once with the required aggregate and placing the mass.

2. The method of making concrete which comprises grinding clinker with sufficient water to discharge a flowing mass of cement fineness ready for mixing with aggregate to concrete with the proper consistency for design.

3. The method of making concrete which comprises grinding crushed clinker with sufficient water to discharge a flowing mixture of cement fineness, incorporating the same at once with the required aggregate and placing the mass.

4. The method of making concrete which comprises grinding clinker with sufficient water to discharge a flowing mixture of cement fineness, incorporating the same with the required aggregate and placing the mass.

5. The method of making concrete which comprises grinding clinker at the job with sufficient water to discharge a flowing mixture of cement fineness, incorporating the same at once with the required aggregate and placing the mass.

6. The method of making concrete which comprises grinding clinker at the job with sufficient water to discharge a flowing mixture of cement fineness, incorporating the same at once with the required aggregate and additional water and placing the mass.

7. The method of making concrete for special purposes which comprises grinding clinker together with extraneous material other than water with sufficient water to discharge a flowing mixture of cement fineness, incorporating the same at once with the required aggregate and placing the mass.

8. The method of making concrete which comprises grinding clinker and gypsum with sufficient water to discharge a flowing mixture of cement fineness and incorporating the same at once with the required aggregate and placing the mass.

9. The method of making special concrete of low heat of hydration which comprises grinding clinker with suitable extraneous materials and water to a flowing mixture of cement fineness and incorporating same at once with the required aggregate and placing the mass.

10. The method of making special plastic and or sulphate-resisting concrete which comprises grinding clinker with suitable extraneous materials and water to a flowing mixture of cement fineness and incorporating same at once with the required aggregate and placing the mass.

HARRY McC. LARMOUR.
STEPHEN C. PIERCE, Jr.